United States Patent [19]
Dockser

[11] Patent Number: 5,845,308
[45] Date of Patent: Dec. 1, 1998

[54] WRAPPED-LINE CACHE FOR MICROPROCESSOR SYSTEM

[75] Inventor: Ken A. Dockser, San Jose, Calif.

[73] Assignee: VLSI Technology, Inc.

[21] Appl. No.: 578,102

[22] Filed: Dec. 27, 1995

[51] Int. Cl.[6] .............................. G06F 9/26; G06F 12/02
[52] U.S. Cl. .............................. 711/3; 711/113; 711/118; 711/119; 711/136
[58] Field of Search .................................. 395/403, 440, 395/445, 455, 281, 450, 465, 469, 470, 471, 800, 200.16, 849, 446, 463

[56] References Cited

U.S. PATENT DOCUMENTS

| | | | |
|---|---|---|---|
| 4,853,846 | 8/1989 | Johnson et al. | 395/281 |
| 4,912,631 | 3/1990 | Lloyd | 395/445 |
| 5,255,378 | 10/1993 | Crawford et al. | 395/849 |
| 5,537,609 | 7/1996 | Whittaker et al. | 395/800 |
| 5,539,894 | 7/1996 | Webber | 395/455 |
| 5,544,342 | 8/1996 | Dean | 395/446 |
| 5,548,742 | 8/1996 | Wang et al. | 395/455 |
| 5,613,071 | 3/1997 | Rankin et al. | 395/200.16 |

OTHER PUBLICATIONS

Jim Handy, The Cache Memory Book, Academic Press, Inc., 1993, pp. 83–84.

*Primary Examiner*—David K. Moore
*Assistant Examiner*—Than V. Nguyen
*Attorney, Agent, or Firm*—Clifton L. Anderson

[57] ABSTRACT

A "wrapped-line" direct-mapped cache is disclosed that stores words with main-memory addresses that succeed a requested address where a conventional nonwrapped direct-mapped line-unit cache would store words with main-memory addresses that precede the requested memory address. Since succeeding addresses are more likely to be called "soon" after a requested address, the wrapped-line direct-mapped cache provides more efficient use of cache capacity, and thus more effectively enhances the performance of an incorporating system. The wrapped-line direct-mapped cache has indexed storage locations. Each storage location has sections for storing a tag, a string-boundary indicator, and a line of words. Each storage location has a line index, and each word position in a line has a word-position index. To determine whether a requested address results in a hit or a miss, the match logic divides the requested address into high, intermediate, and low segments. The hit-or-miss determination is made by examining the tag and string-boundary sections of the "requested" cache storage location (indexed by intermediate bits of the requested address) as well as of the predecessor storage location. In the event of a hit, the requested word is transmitted from the cache for processing by a microprocessor. In the event of a miss, the high segment is stored in the tag section of the requested storage location to serve as a tag. In addition, the low segment of the requested address is stored in the string-boundary section of the requested storage location to serve as a string-boundary indicator. The requested and successor addresses are transmitted to main memory so that each word so fetched is stored at a word position having its word-position index equaling the word's main-memory-address low segment. The requested word is forwarded from the cache for processing by the microprocessor.

8 Claims, 2 Drawing Sheets

WRAPPED-LINE CACHE FOR MICROPROCESSOR SYSTEM

BACKGROUND OF THE INVENTION

The present invention relates to data processing and, more particularly, to a cache and cache method for microprocessor systems. A major objective of the present invention is to provide a cache that uses its capacity more efficiently to enhance the performance of an incorporating microprocessor system.

Much of modern progress is associated with advances in computer performance. Computer performance has been enhanced by the development of ever faster microprocessors. However, increases in microprocessor speed provide diminishing returns unless the speed of interaction with associated components is also increased.

One bottleneck has been the communication rate between a microprocessor and main memory. The instructions to be executed by the microprocessor, and the data on which operations implemented by the instructions are to be performed, are stored at addresses within main memory. To access instructions and data, the microprocessor transmits addresses to main memory. Main memory decodes each address and makes the contents stored at the address available for reading and/or writing. The time required for the microprocessor to transmit an address to main memory and receive the respective contents therefrom can significantly constrain system performance.

Caches relax this performance constraint. A cache is a small, fast memory that keeps copies of recently used memory items. When these items are used again, for example, in a program loop, they can be accessed from the cache instead of from main memory. Instead of slower main memory access speeds, the processor can operate at faster cache access speeds much of the time. Caches are used extensively in high-performance computers and are migrating to smaller computer systems. In particular, caches are being implemented in the increasingly popular reduced-instruction set computers (RISC) because they rely on fast execution of relatively high numbers of simple instructions.

During a processor read from main memory, the contents of an address are provided to the microprocessor faster when the requested address is represented in the cache (a cache "hit") than they would have been without the cache. When a requested address is not in the cache (a cache "miss"), the contents are not returned faster than they would have been without the cache. Accordingly, cache performance is closely tied to the likelihood of finding the requested contents in the cache. This likelihood is related to the number of words that can be stored in a cache and to the employed strategy for selecting the words to be stored in the cache.

In the event of a processor write to memory, the write cycle can be completed more quickly if the address to be written to is represented in the cache than it would be if no cache were used. In a "write-through" cache, the contents written to the cache are copied immediately to main memory. In a "write-back" cache, the copying to main memory is delayed until its representation in the cache is overwritten or otherwise purged. Ensuring consistency of main memory and cache is more difficult with the "write-back" approach, but it can reduce bus traffic where a storage location is repeatedly written to by a processor.

A "word" is a unit of information that is "meaningful" to the microprocessor. Early microprocessors processed data eight bits at a time, so a word for these microprocessors was eight bits or one byte. During the 1980s, most microprocessors processed 16-bit words. During the 1990s, microprocessors using 32-bit words are prevalent. The capacities of modern caches range from kilowords (thousands of words), e.g., for modest internal caches, to hundreds of kilowords, e.g., for large external caches.

"Line-unit" caches use physical storage capacity more efficiently and offer improved hit ratios relative to "word-unit" caches. In a word-unit cache, the "requested" word at a requested address is stored together with the requested address in the cache. In a line-unit cache, the words of "neighboring" addresses differing only in a predetermined number of least significant address bits are stored along with the requested word. Along with the requested and "neighboring" words is stored a line address, constituted by the common most significant bits of the requested and neighboring addresses. The line address is shorter than the full requested address and only one line address is required for the entire line of words, contributing to the greater storage efficiency of the line-unit cache.

Line-unit caches can be fully associative, set associative, or direct mapped. In a fully associative line-unit cache, each line can be stored at any line location within the cache. A disadvantage of a fully associative cache is that a requested address must be compared with every line address to determine whether a hit or a miss results. The complexity of and, correspondingly, the time required for matching increase with cache size. This places practical limits on the capacity of a fully associative cache, limiting the hit ratio for the cache and thus the extent to which it can enhance performance of an incorporating microprocessor system.

In a set-associative cache, the cache is divided into sets. Each line can be stored in only one of these sets. For example, four least significant line-address "set-index" bits can be dedicated for set indexing; the four bits can be used for distinguishing sixteen sets. Each fetched line can be stored only in the set with an index matching the set-index bits of its line address. When an address request is made, the set-index bits of that address are examined to determine which set is relevant. The remaining line address bits are examined for a match. Thus, the number of items that must be compared and the number of bits required per comparison are both reduced in a set-associative line-unit cache.

Direct-mapped line-unit caches take set associativity to the extreme. Each cache line-storage location is given a unique index. For example, each of $2^{10}$=1024 line locations in a cache can be assigned a unique ten-bit index. The index is associated with specific line-address bits; in the example, the least significant ten line-address bits can be considered as "index" bits. When a cache miss occurs, a line is fetched and stored at the line location determined by the (ten) index bits. Stored with the line are the non-index line address "tag" bits. When an address request is received, the tag bits stored in the respective indexed line location are compared with the corresponding requested address bits to determine whether there is a match. Only one comparison is required to determine whether there is a hit or a miss, providing for high speed cache operation. The number of comparisons required is independent of cache size, providing excellent scalability for direct-mapped line-unit caches.

The effectiveness of a line-unit cache varies with the position of the requested word within the fetched line. Successive addresses are far more likely to be called soon after a requested address than are preceding addresses; this is especially true for instruction sequences. If the requested word occupies the first position in the line, the rest of the line is filled with the contents of successive addresses; this is the optimal case. If the requested word occupies an intermediate line position, the preceding addresses represented in the line are relatively unlikely to be requested "soon"; accordingly, cache capacity is not used to maximum efficiency.

In the worst case, the requested word occupies the last position in the line. Most of the line capacity is wasted. Furthermore, if the microprocessor next requests the succeeding address, the cache must initiate a second line fetch. Thus, while the line-unit cache affords moderately efficient use of cache capacity, there is clearly room for improvement. With the ever increasing demand for computational speed, the search continues for higher performance caches.

SUMMARY OF THE INVENTION

The present invention provides a "wrapped-line" cache with match logic, an address generator, and cache storage. The cache storage includes a number of cache storage locations. Each cache storage location has a tag section, a string-boundary section, and a line section. Each line section includes plural word positions, each with a respective word-position index.

In accordance with the present invention, the requested address is the lowest address represented by a string of words fetched in response to a cache miss. The length of the string in words is equal to the number of word positions in a cache storage location. In contrast to a conventional line-unit cache, the present invention does not constrain the first word of a fetched string to be stored at the first word position of a storage location. If the requested word is not stored at the first word position, succeeding word positions are filled before all the words of the string are stored in the cache storage locations; the remaining words are "wrapped" around to the beginning of the line to complete string storage. In the event of a wrap, the requested word is preceded in the cache line by one or more words from successor addresses (rather than predecessor addresses as in a conventional indexed line-unit cache).

Each requested address can be conceptually divided into a line-address segment and an r-bit word-position segment. The line-address segment and the word-position segment collectively constitute a "word address". (The requested address can also contain additional low-order bits indicating byte position within a word.) The number (r) of bits of a word-position segment is the same as the number of bits in the string-boundary section of a storage location. The number ($2^r$) of word positions in the line section of a storage location is two raised to the number of bits in a word-position segment.

The line-address segment includes a "tag" segment (in other words, a tag subsegment). In the case of a fully associative embodiment of the invention, the line-address segment is the tag segment. In the case of a set-associative embodiment, the line-address segment also includes a set-index segment. In the case of the directed-mapped embodiment, the line-address segment also includes a line-index segment.

When a requested address (generated by the microprocessor) is received by the cache, the match logic checks the cache storage to determine whether there is a hit or a miss. In the direct-mapped embodiment, two cache storage locations are checked: a "requested" cache storage location with an index equal to the intermediate segment of the requested address, and a "predecessor" cache storage location with an index equal to one less (modulo the number of cache line locations) the intermediate segment of the requested address. A hit is determined when either of the following two compound conditions are met:

1) a) the high segment of the requested address matches the tag stored at the requested cache storage location, and b) the low segment of the requested address equals or exceeds the string-boundary indicator stored at the requested cache storage location; or 2) a) the high segment of the requested address matches the tag stored at the predecessor cache storage location, and b) the low segment of the requested address is less than the string-boundary indicator stored at the predecessor cache storage location.

In the event a hit is determined during a read request, the word at the word position matching the low segment of the requested address at the cache storage location where the match condition is met is transmitted for processing by the microprocessor. This completes the "hit" response of the cache to a requested address. The hit response to a write request is similar except that word is written from the microprocessor to the cache.

If neither of the two compound conditions is met, a miss is determined. When a miss is determined in response to a read request, the match logic stores the high and low segments of the requested address in the cache storage location with an index equal to the intermediate segment of the requested address. The high segment is stored in the tag section, while the low segment is stored in the string-boundary section. The high segment thus becomes a tag and the low segment becomes a string-boundary indicator. The match logic also transmits a "miss" detection and the requested address to the cache's address generator.

The address generator asserts the low segment of the requested address to the cache storage. This selects a word-position index, defining a cache word position for storing a word. The address generator concurrently transmits the requested address to main memory. Main memory responds by transmitting the "requested" word to the cache so that it is stored at the selected word position. The requested word is also transmitted for processing by the microprocessor.

The address generator then successively asserts $2^r-1$ successor addresses. For each successive address, the address generator increments the word-position index. Thus, each word transmitted from main memory in response to a successor address is stored at a respective word position within the cache storage location indexed by the requested address's low segment. In the event that the address generator increments (modulo $2^r$) the word-position index from all 1s to all 0s, the fetched string wraps around to the first position of the storage location. Any remaining words of the string fill in the storage location up to and excluding the word position occupied by the requested word. This completes the "miss" response of the cache to a read request.

During a write request, there are two main alternatives in the event of a miss. In a "non-allocation" approach, the word is written directly to main memory without first fetching a string. In an "allocation" approach, the corresponding string is fetched from main memory, and then the write is performed over the fetched string; to save time, the fetch can omit the word at the requested address.

The direct-mapped embodiment of the invention requires two storage locations to be checked for a hit in contrast to a conventional direct-mapped cache in which only one location needs to be checked. In a fully associative embodiment, all storage locations must be checked, as in a conventional fully associative embodiment. In a conventional set-associative embodiment in which the least significant line-address bits are used to index the sections, all locations in the section indicated by the requested address and the predecessor section must be checked.

The present invention further provides for conflict resolution when an address is represented twice in the cache. If an address is represented at two different storage locations, it must have been entered in one of them first. As long as all writes to the requested address are directed to this first filled storage location, it will accurately reflect what the contents of the corresponding main memory address would have been without a cache. Accordingly, this first filled location should be given precedence over the second filled location in all reads and writes.

The preferred way to effect this precedence is to assign validity bits to each word position of each storage location. Anytime the contents of a main memory address already represented in the cache are fetched, the location in which those contents are subsequently stored is marked invalid. The contents of the invalid storage location cannot be used to indicate a hit for subsequent read or write operations. In the context of a write-back cache, the invalidity indicator can be used to warn other processors along with any associated caches and memory in a system of the invalidity during write backs.

An alternative method of effecting precedence of the first-filled storage location is to have the match logic determine which of two instances was first filled from the relative positions of the string boundary and the requested address. The storage location at which the requested address is closest to the lowest address represented in the storage location is the first storage location. Its contents are then written over during writes, provided to the processor during reads, and copied to main memory during write backs.

The main advantage of the wrapped-line cache is that there is no line capacity wasted when the requested address is at an intermediate or end position of a line. Therefore, cache capacity is used more efficiently. In addition, the next requested addresses are more likely to be found in the cache so that fewer line fetches are required.

The present invention is not the only approach to overcoming the weaknesses of the unwrapped line-unit cache. However, the present invention incurs minimal penalty in overcoming these weaknesses. While the present invention can require additional comparisons, logic design can provide for concurrent comparisons, limiting the penalty to a couple of gate delays. Furthermore, this disadvantage does not scale with increasing cache size. In most cases, the slight reduction in match speed is insignificant compared to the gain in hit ratio afforded by the present invention. These and other features and advantages are apparent from the description below with reference to the following drawings.

DESCRIPTION OF THE PREFERRED EMBODIMENTS

Figure 1:
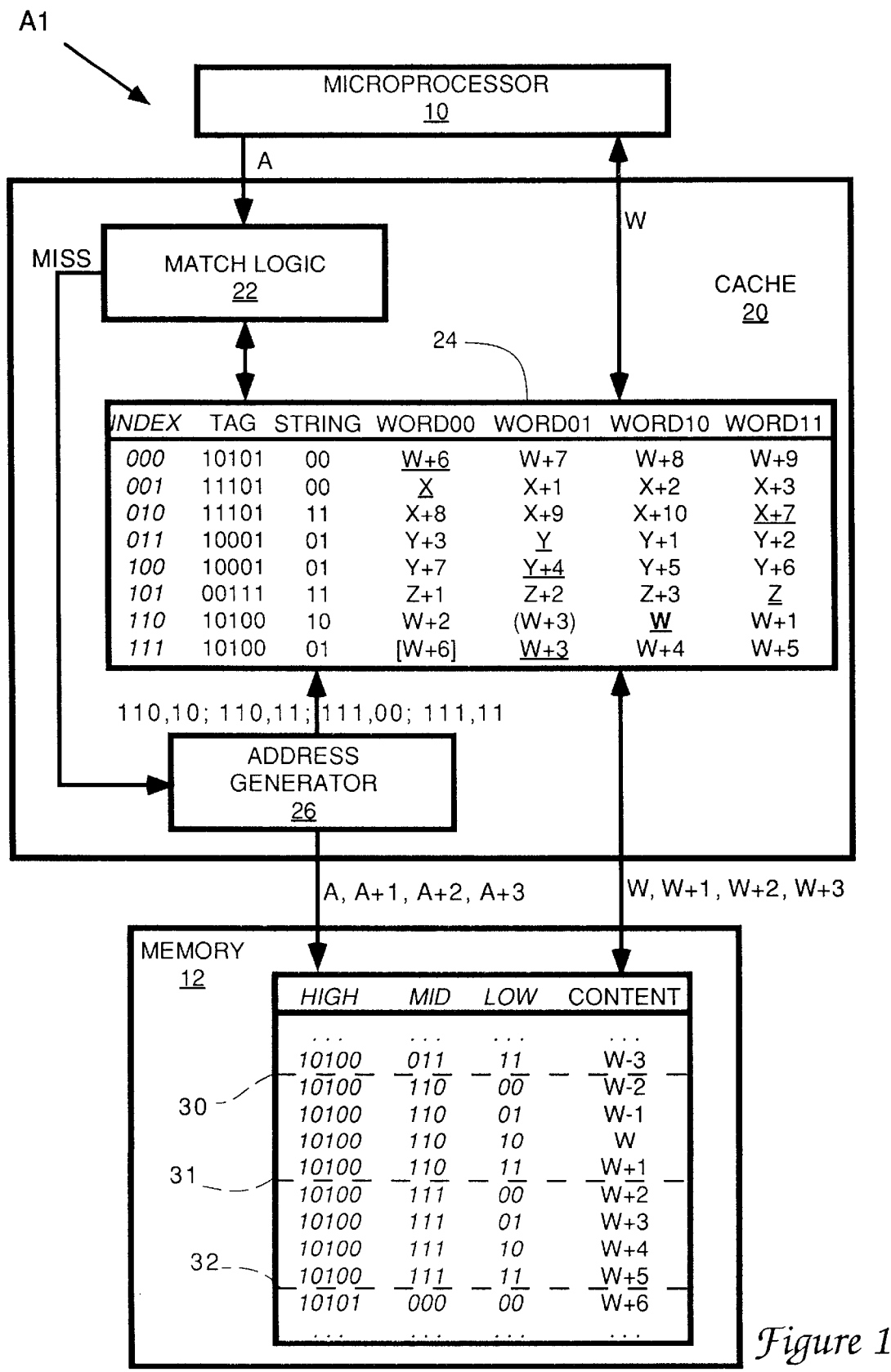
FIG. 1 is a schematic diagram of a microprocessor system including a direct-mapped wrapped-line cache in accordance with the present invention.

In accordance with the present invention, a microprocessor system A1 comprises a microprocessor 10, main memory 12, and a direct-mapped wrapped-line cache 20, as shown in FIG. 1. Cache 20 includes match logic 22, cache storage 24, and an address generator 26.

The preferred specifications for system A1 include thirty-two bit processing, thirty-two bit addressing, and byte-addressable main memory. A thirty-two bit address can be divided into an eighteen-bit high segment (of most significant bits) that can serve as a tag, a ten-bit intermediate segment that can serve as a line index defining $2^{10}$=1024 cache storage locations, a two-bit low segment that can serve as a word-position index defining four word positions per cache storage location, and a two-bit least significant segment used to index byte position within a word. (The byte-position segment is not otherwise germane to the present invention).

For expository purposes, system A1 is shown with ten-bit word addressing and cache 20 has a 32-word capacity. Cache 20 utilizes a four-word line length, which is selected to approximate the expected average number of instructions before a branch. If too few words are included per line, more misses and fetches are required than necessary; if too many words are included per line, cache capacity and time spent fetching are wasted. The number of words can be varied according to the nature of the programs to be run on microprocessor system A1. Preferably, the number is a power of two so that word position is conveniently indicated by low order address bits. Thus, in practice, the line length is four, eight, or sixteen words.

The 32-word capacity of cache 20 is divided by the chosen four-word line length to determine the number, 8=32÷4, of cache storage locations. The logarithm (base 2) of the number, 8, of cache storage locations determines the number, 3, of line-index bits required. The number, 3, of bits in an intermediate segment of an address is set equal to the number, 3, of bits in a line index. The logarithm of the number, 4, of words in a line determines the number, 2, of bits in a word-position index. The number, 2, of bits in a string-boundary indicator is set equal to the number, 2, of bits in a word-position index. Likewise, the number, 2, of bits in a low segment of an address is set equal to the number, 2, of bits in a word-position index.

The number, 8, of bits in a line address (segment) is the number, 10, of bits in a word address minus the number, 2, of bits in a word-position index. The number, 5, of bits in the high segment of an address is set equal to the number, 8, of bits in a word address minus the number, 3, of intermediate segment bits. The number, 5, of bits in a tag is set equal to the number of bits, 5, in the high segment of an address.

The breakdown of addresses into high, intermediate, and low segments is illustrated with main memory 12 in FIG. 1 (in which the heading "MID" corresponds to the intermediate segments). Note that the values of the low segment repeat every four addresses, defining line boundaries 30, 31, 32, and so on. The breakdown of cache storage 24 into line indices, tags, string-boundary indicators, and lines with four word is also shown in FIG. 1. Each word position has an associated two-bit word-position index, e.g., the word position index for word W in column WORD10 is 10. For each word stored in a word position within cache storage 24, the low segment of the word's main-memory address equals the index of the word-position.

In the preferred embodiment, all words stored in any given cache storage location at any given time have main-memory addresses with the same five-bit high segment; this segment is listed as the tag in the storage location. For example, at storage location 110, all four words (W+2, W+3, W, W+1, share the tag 10100. In an alternative embodiment, an exception occurs when the fetched string crosses a line boundary, e.g., line boundary 32, that is also a tag-section boundary. When a string crosses a tag-section boundary, the line index wraps from 111 to 000 and the resulting carry causes the main-memory-address high segment of the last word(s) in the string to exceed by one the locally stored tag. Thus, at cache storage location 111, the high segment of the main-memory address of word W+6 is 10101, which is higher than the tag 10100 for storage location 111; the remaining words stored at location 111 have main-memory-address high segments equal to the local tag 10100.

In the preferred embodiment, this exception is avoided by not fetching words across the tag-section boundary. Thus, in FIG. 1, word W+6 is shown in brackets to indicate it is not fetched in the preferred embodiment. The word-position locations left unfilled are marked invalid.

All words in a given storage location have three-bit intermediate segments that either equal the storage location line index or exceed the line index by one. Thus, word W stored at cache storage location 110 has intermediate (MID) segment 110, equal to the local line index; word W+3 at cache storage location 110 has intermediate segment 111, one greater than the local line index.

The local string-boundary indicator determines which words have main-memory-address intermediate segments equal to the local line index and which words have main-memory-address intermediate segments that exceed the local line index by one. If a word's main-memory address low segment is equal to or exceeds the local string-boundary indicator, its main-memory-address intermediate segment equals the local line index. If a word's main-memory-address low segment is less than the local string-boundary, the intermediate segment exceeds by one the local line index. In FIG. 1, for each storage location, the word position indicated by the local string-boundary indicator is underlined.

Since two different intermediate segments can be found at a cache storage location, it follows that a given intermediate segment potentially can be found at either of two different cache storage locations. Potentially, a word having a given main-memory address can be found either at the cache storage location having the index indicated by its intermediate segment or at the cache storage location having the preceding index. In fact, it is possible for a word to be located in both of these cache storage locations at once. For example, word W+3, having a main-memory address 10100, 111,01 is found at line indices 110 and 111 (in both cases at word position 01). This type of redundancy is relatively rare in instruction sequences, since it requires that lower addressed word W be called after higher addressed word W+3.

Accordingly, match logic 22 must test the predecessor cache storage location if there is no match found at the requested storage location. To save time, both requested and predecessor cache storage locations are checked concurrently. If the requested address is represented at both locations, the contents of the requested address at the predecessor address will have been marked invalid. To this end, cache 20 provides a validity bit for each word position at each storage location. For each address represented at both a requested storage location and a predecessor storage location, the contents at the predecessor storage location are marked invalid. FIG. 1 depicts invalid contents with parenthesis, e.g., (W+3) at storage location 110.

The reward for this added match complexity is more efficient utilization of cache capacity. In response to a miss of a requested address 10100,110,10, a conventional indexed line-unit cache would store: word W−2 at line-index 110, word position 00; word W−1 at 110,01; word W at 110,10; and word W+1 at 110,11. The present invention replaces word W−2 with word W+2 and word W−1 with word W+3. Since words W+2 and W+3 are more likely to be requested soon after word W than are W−2 and W−1, the present invention generally provides a higher hit ratio than a non-wrapping direct-mapped line-unit cache.

Figure 2:
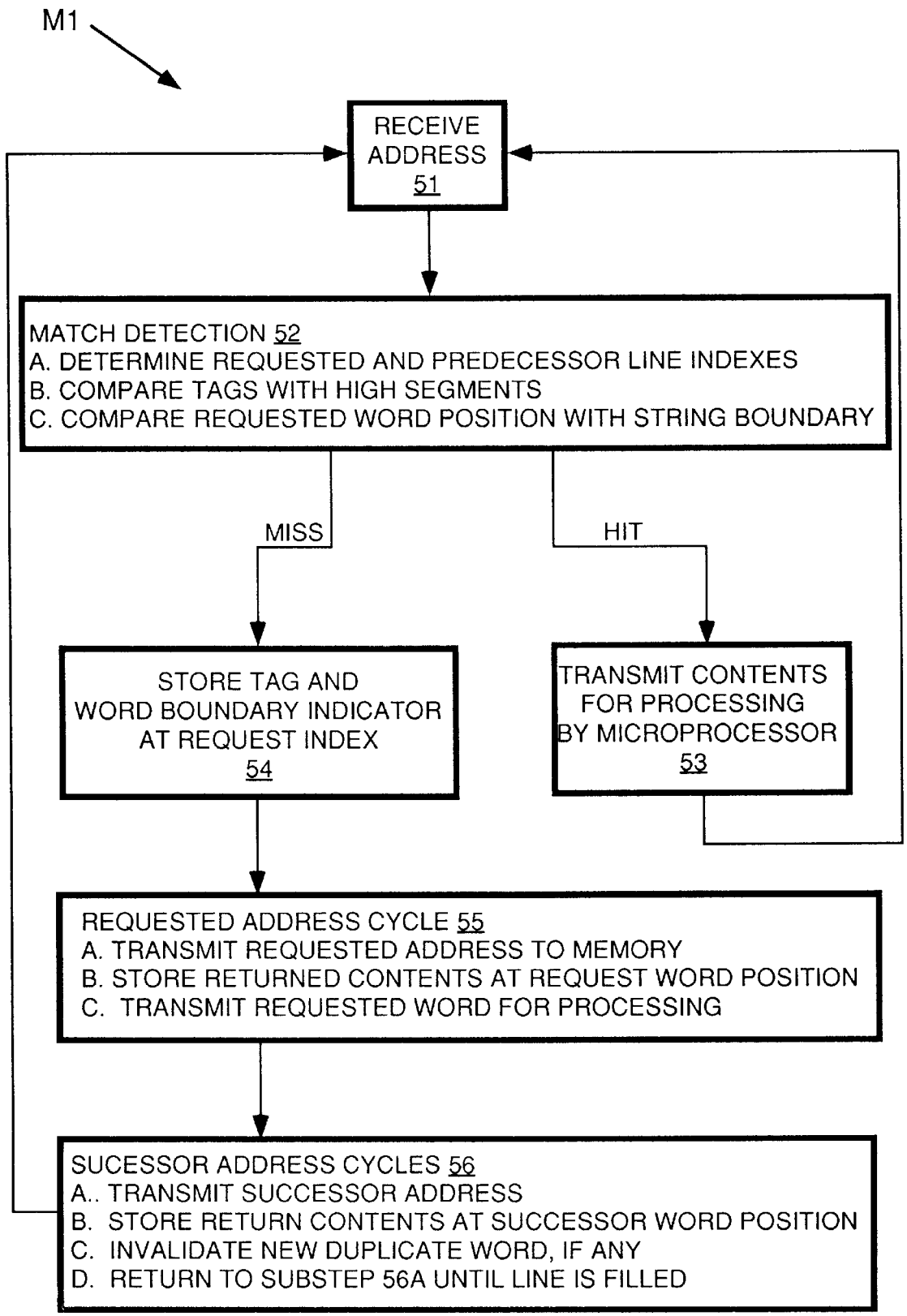
FIG. 2 is a flow chart of a method of the invention practiced in the context of the system of FIG. 1.

The method M1 employed by cache 20 is flow-charted in FIG. 2. An address (A=10100,110,10 as indicated in FIG. 1) requested by microprocessor 10 is received by cache 20 at step 51. Match logic 22 performs match detection at step 52. At substep 52A, match logic 22 extracts a "requested" line index (110), which is the intermediate segment of the requested address. In addition, match logic 22 also determines a predecessor line index (101) by subtracting one from the requested line index. The subtraction is modulo eight (or, more generally, modulo the number of cache storage location indices) so that the last cache storage location, with index 111, is the predecessor of the first cache storage location, with index 000, since 000−1=111, modulo 8. The requested and predecessor line indices thus respectively identify "requested" and "predecessor" cache storage locations.

The tag (10100) stored at the requested storage location (110) and the tag (00111) stored at the predecessor storage location (101) are compared with the "requested" high segment (10100) of the requested address at substep 52B. If neither tag matches the requested high segment, a miss is determined. If one (or both) of the tags matches the requested high segment, the low segment of the requested address is compared with the string-boundary indicator(s) for the storage location(s) with a matching tag. The low segment of the requested address de fines a requested word-position index.

A hit is determined if either or both of the following compound conditions is met:

1) a) the requested tag matches the tag stored at the requested cache storage location, and b) the requested word-position index equals or exceeds the string-boundary indicator stored at the requested cache storage location; and 2) a) the requested tag matches the tag stored at the predecessor cache storage location, and b) the requested word-position index is less than the string-boundary indicator stored at the predecessor cache storage location.

A miss is determined if neither of these two compound conditions is met. If a hit is determined, method M1 continues with step 53; if a miss is determined, method M1 proceeds to step 54. Where the requested address is 10100, 110,10, the first condition is met, but the second condition is not.

In the event a read request results in a hit, cache 20 transmits, at step 53, the word (W) stored at the word position indicated by the requested word-position index (10) of the requested storage location (110) for processing by microprocessor 10. At this point, the hit response of cache 20 to a requested address is complete. The case for a write request hit is similar except that the word is written from microprocessor 10 to cache 20.

In FIG. 1, the illustrated contents of cache storage 24 yield a hit because the requested word W is stored at requested word position 10 of requested storage location 110 and at the requested main-memory address (A=10100,110,10). For the purposes of the following description of a miss determination, the illustrated cache contents are the contents at the completion of the "miss" response to the requested address. Prior to step 54, the contents of cache storage location 110 differ from the illustrated values.

In the event of a miss, match logic 22 stores the requested tag (10100) in the tag section of the requested storage location and stores the requested word-position index (10) in the string-boundary section of the requested storage location (110), at step 54. In addition, match logic 22 indicates the miss determination to address generator 26 and also provides the requested address to address generator 26.

In the preferred case of a write-back cache, the line to be overwritten must be first written back to main memory if it has been modified. In the case of a write-through cache, the target string can be fetched from main memory without performing a write-back. In the event of a write miss, the addressed word position is then overwritten by the microprocessor. In the event of a write miss with a write-through cache, the word is then written through to main memory. Alternatively, the word to be written is written into the cache; the first word is then omitted in the subsequently fetched string.

Address generator 26 initiates a string fetch with a requested address cycle at step 55. At substep 55A, address generator 26 transmits the requested address (A=10100,110, 10) to main memory 12. In addition, address generator 26 asserts the requested word-position index to cache storage 24. This enables the indexed word position for storage. Main memory 12 responds to the requested address (A) by transmitting its contents (W). When the requested word (W) is received by cache 20, it is stored in the appropriate word position (10) of the appropriate cache storage location (110) at substep 55B. At substep 55C, the requested word (W) is forwarded for processing by microprocessor 10.

Successor address cycles are executed at step 56. At substep 56A, first iteration, address generator 26 generates and transmits to main memory 12 the successor address (A+1=10100,110,11) of the requested address. At substep 56B, first iteration, address generator 26 maintains index (110), but increments the word position (to 11) that it asserts to cache storage 24. Thus, the returned word (W+1) is stored at the requested index location (110) in the successor word position (11). At substep 56C, match logic 22 determines whether address A+1 is represented in cache 20. In this case, it is not, so the validity bit for W+1 is set valid. (Note that this determination can be made any time during step 56.) Substep 56D involves second and third iterations of substeps 56A and 56B.

In the second iteration of substep 56A, address generator 26 generates and transmits to main memory 12 the second successor address (A+2=10100,111,00) and increments the word position it asserts to cache storage 24. Thus, the word at the second successor address is stored in the second successor word position at the requested storage location at substep 56B. In the illustrated case, the word position is incremented modulo four to word position 00; this is where the line wrap occurs. Despite being the third word of the fetched string, word W+2 is stored at the first word position 00 of storage location 110. Due to this wrap around, the intermediate segment (111) of main-memory address A+2 differs from the requested line index (110). At the second iteration of substep 56C, match logic 22 determines whether or not address A+2 is represented in cache 20. In this case, it is not, so the validity bit for W+2 is set valid.

In the third iteration of substep 56A, third successor address (A+3=10100,111,01) is transmitted to main memory 12. Its content word W+3 is stored at word position 01 of cache storage location 110 at the third iteration of substep 56B. Note that this last word W+3 immediately precedes first word W in storage location 110. At the third iteration of substep 56C, match logic 22 determines whether or not address A+3 is represented at another cache storage location.

In this case, it is represented at previously filled storage location 111. Therefore, the validity bit for cache storage location 110, word position 01 is set to invalid. This invalidity is indicated by the parentheses around W+3 in FIG. 1. This completes the miss response to the address request.

In an alternative fully associative embodiment of the invention, all locations are checked for each requested address. Later filled duplicate contents are marked invalid as in the preferred embodiment. In a set-associative embodiment in which the least significant line-address bits are used to index sets, all locations in a target set and a predecessor set are checked.

In the fully associative and set associative embodiments, there is no unique "requested" storage location. Instead, the match logic selects a target storage location to be purged to permit a new string of fetched words to be stored. In any of the write-back embodiments, a purged string can be written back to main memory to the extent indicated by any validity bits. Other processors can monitor the validity bits to determine whether or not the write-back contents are valid or not. An alternative to marking individual cache word locations as valid or invalid is to use a single bit for each cache line location to indicate whether it valid or not. In this case, all words of a line are treated as through they are invalid even when only one is actually invalid.

In the illustrated embodiment, four-word lines are used. The invention provides for other line lengths. For example, eight-word lines can be used, with three bits used for word-position indices and for string-boundary indicators. Different numbers of bits can be used for line indices (providing for caches of different capacities) and for tags. The illustrated cache is external; the invention also provides for caches internal to the microprocessor. The illustrated cache is a combined data and instruction cache. An alternative preferred embodiment employs the invention in the context of an instruction-only cache. Moreover, the invention can also be applied to a data-only cache. These above-described and other modifications to and variations upon the preferred embodiments are provided for by the present invention, the scope of which is limited only by the following claims.

What is claimed is:

1. A cache for enhancing the performance of a microprocessor system including a microprocessor and main memory, said main memory storing information in the form of binary words at respective addresses of said main memory, said main memory transmitting the word stored at an address in response to a reception of that address, each of said addresses having a line-address segment and an r-bit word-position segment, each of said line-address segments including a respective tag segment, said microprocessor transmitting a requested read address, the line-address segment of said requested address defining a requested line address, the tag segment of said requested address defining a requested tag, the word-position segment of said requested address defining a requested word-position index, said cache comprising:

cache storage for temporarily storing those of said words that are transmitted from said main memory to said microprocessor, said cache storage having plural storage locations including a target storage location, each of said storage locations having a tag section for storing a tag that identifies a respective line address, a string-boundary section for storing an r-bit string-boundary indicator, and a line section for storing a string of said words, each line section having $2^r$ word positions, each of said word positions of a line section having a respective r-bit word-position index, said cache storage being coupled to said microprocessor for transmitting words stored in said cache storage for processing by said microprocessor, said cache storage being coupled to said main memory for receiving words therefrom;

match logic for making a hit-or-miss determination when said requested address is received, said match logic determining from said requested address a requested word that is the word stored at said requested address in said main memory, a hit determination indicating that said requested word is in said cache storage, said match logic causing said requested word to be transmitted from said cache storage for processing by said microprocessor in the event of a hit determination, a miss determination indicating that said requested word is not in said cache storage, said match logic storing said requested tag at the tag section of said target storage location in the event of a miss determination, said match logic storing the requested word-position index at the string-boundary section of said target storage location in the event of a miss determination, said match logic making said hit-or-miss determination as a function of the tags and the string-boundary indicators at said storage locations, said match logic being coupled to said cache storage for making said match determination and for storing said requested tag and said requested word position index therein; and an address generator for transmitting addresses to said main memory in the event of a miss determination, said address generator transmitting said requested address and $2^r-1$ successor addresses to said main memory, said address generator causing said requested word and the words stored at said successor addresses to be respectively stored at the word positions of said target storage location corresponding to the word-position segments of their respective main-memory addresses, said address generator being coupled to said match logic for receiving said miss determination, said address generator being coupled to said main memory for transmitting addresses thereto, said address generator being coupled to said cache storage for selecting said target storage location and word positions therein for storage of words received from said main memory.

2. A cache as recited in claim 1 wherein each of said line-address segments includes a respective line-index segment so that said requested address defines a requested line index, each of said cache storage locations having a respective line index, said target storage location being selected so that its line index equals said required line index, said match logic making said hit-or-miss determination as a function of the tags and the string-boundary indicators at said target storage location and at a predecessor storage location having a line index one less than said requested line index.

3. A cache as recited in claim 2 wherein said match logic makes said hit determination when at least one of the following two compound conditions is met, said match logic making said miss determination when neither of the following two compound conditions is met:

1) a) said requested tag matches the tag stored at said target storage location, and b) said requested word-position index equals or exceeds the string-boundary indicator stored at said target storage location; and 2) a) said requested tag matches the tag stored at said predecessor storage location, and b) said requested word-position index is less than the string-boundary indicator stored at said predecessor storage location.

4. A cache as recited in claim 1 wherein each of said word positions has an associated validity bit that indicates whether the word stored at that position is valid or invalid.

5. A method of managing a cache in a system including a microprocessor and main memory, said main memory storing information in the form of binary words at respective addresses of said main memory, said main memory transmitting the word stored at an address in response to a reception of that address, each of said addresses having a line-address segment, and an r-bit word-position segment, said line-address segment including a tag segment, said method comprising the steps of:

A) receiving a requested read address, said requested address defining
  a requested line address represented by the line-address segment of said requested address,
  a requested tag represented by the tag segment of said requested address,
  a requested word-position index represented by the word-position segment of said requested address, and
  a requested word that is the word stored at said requested address in said main memory;

B) determining whether said requested word results in a hit or a miss, said hit being determined if said requested word is in said cache, said miss being determined if said requested word is not in said cache, continuing and ending with step C if a hit is determined, continuing with step D ending with step F if a miss is determined;

C) transmitting said requested word for processing by said microprocessor, thereby completing a hit response to said requested address;

D) storing said requested tag and said requested word-position index at respective tag and string-boundary sections of said target storage location of said cache;

E) performing a requested address cycle by transmitting said requested address to said main memory and when said requested word is received from said main memory, storing said requested word in said target storage location at a word position indexed by said requested word-position index, and transmitting said requested word for processing by said microprocessor; and F) performing successor address cycles by transmitting $2^r-1$ successor addresses of said requested address to said main memory, for each of said successor addresses, storing in said target storage location the word returned from said main memory at a word position indexed by the word-position segment of that successor address, thereby completing a miss response to said requested address.

6. A method as recited in claim 5 wherein each said line addresses include a line-index segment, the line-index segment of said requested address determining said target storage location and its immediate predecessor storage location, the determination of step B being made as a function of the contents of said target storage location and of the contents of said predecessor storage location.

7. A method as recited in claim 6 wherein said determining step B results in a hit when at least one of the following two compound conditions is met, said determining step B resulting in a miss when neither of the following two compound conditions is met:

1) a) said requested tag matches the tag stored at said target storage location, and b) said requested word-position index equals or exceeds a string-boundary indicator stored at said target storage location; and 2) a) said requested tag matches the tag stored at said predecessor storage location, and b) said requested word-position index is less than a string-boundary indicator stored at said predecessor storage location.

8. A method as recited in claim 5 wherein step F involves setting a validity bit of a word position of said target storage location to invalid if the address of the word to be stored in that word position is the same as the address of a word stored at another storage location in said cache.

* * * * *